(12) United States Patent
Ortiz et al.

(10) Patent No.: US 7,038,435 B2
(45) Date of Patent: May 2, 2006

(54) METHOD FOR INPUT CURRENT REGULATION AND ACTIVE-POWER FILTER WITH INPUT VOLTAGE FEEDFORWARD AND OUTPUT LOAD FEEDFORWARD

(75) Inventors: Joe A. Ortiz, Garden Grove, CA (US); Joseph K. Miyamoto, Torrance, CA (US); Frank H. Wang, Rosemead, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/720,297

(22) Filed: Nov. 24, 2003

(65) Prior Publication Data

US 2005/0110474 A1    May 26, 2005

(51) Int. Cl.
*G05F 1/40* (2006.01)
(52) U.S. Cl. ........................ 323/282; 323/222; 363/89; 363/81
(58) Field of Classification Search ................ 323/222, 323/223, 207, 239, 284, 282; 363/84, 89, 363/65, 45, 44, 82
See application file for complete search history.

(56) References Cited

U.S. PATENT DOCUMENTS 4,872,127 A   10/1989  Nolan
4,891,744 A    1/1990  Yamamoto
5,668,464 A *  9/1997  Krein et al. ................ 323/259

(Continued)

OTHER PUBLICATIONS

Rami, Naim et al: "H Deg Deg Control of Boost Converters: Comparison to Voltage Mode, feedforward, and Current Mode Controls", Record of the Annual Power Electronics Specialists Conference, Jun. 12, 1995, pp 1327-1332, vol. 2 conf. 26, IEEE, New York, NY, USA.

(Continued)

*Primary Examiner*—Rajnikant B. Patel
(74) *Attorney, Agent, or Firm*—John E. Gunther; Leonard A. Alkov; Karl A. Vick

(57) ABSTRACT

An active-power filter includes control circuitry to combine an integrated output-voltage feedback signal, an input-voltage sense signal and an output-load feedforward signal to generate a control signal. An output-load subsystem draws the output current from the active-power filter and the output-load feedforward signal indicates when current drawn by an output-load subsystem changes. In some embodiments, the output-load subsystem may draw output current from the power converter having an output current ripple at a nominal frequency, which may range, for example, between about 35 and 100 Hz. The control circuitry may include an integrator to integrate the output-voltage feedback signal. The integrator may have a control loop bandwidth significantly less than the nominal ripple frequency to loosely regulate the output voltage while the input current drawn by the active-power filter is tightly regulated.

25 Claims, 8 Drawing Sheets

U.S. PATENT DOCUMENTS

| | | | |
|---|---|---|---|
| 5,777,866 A * | 7/1998 | Jacobs et al. | 363/126 |
| 5,867,379 A * | 2/1999 | Maksimovic et al. | 363/89 |
| 6,101,108 A * | 8/2000 | Wittenbreder, Jr. | 363/65 |
| 6,259,614 B1 * | 7/2001 | Ribarich et al. | 363/89 |
| 6,657,417 B1 * | 12/2003 | Hwang | 323/222 |

OTHER PUBLICATIONS

Redl, R et al: "Optimizing the Load Transient Response of the Buck Converter", Applied Power Electronics Conference and Exposition, Feb. 15, 1998, pp 170-176, vol. 1, IEEE, New York, NY, USA.

Kanemaru, S et al: "Analysis and Optimum Design of a Buck-Type DC-to DC Converter Employing Load current Feedforward", Power Electronics Specialists Conference, May 17, 1998, pp 309-314, vol. 1, IEEE, New York, NY, USA.

* cited by examiner

METHOD FOR INPUT CURRENT REGULATION AND ACTIVE-POWER FILTER WITH INPUT VOLTAGE FEEDFORWARD AND OUTPUT LOAD FEEDFORWARD

TECHNICAL FIELD

The present invention pertains to electrical power systems, in particular to current and voltage regulation, and more particularly to active-power filters.

BACKGROUND

Electronics systems, such as communication systems, radar systems, infrared-sensor systems, laser-tracking systems, or directed-energy systems, whether ground-based, mobile, airborne, shipboard, or spacecraft based, generally have several subsystems that receive power from a power source over an electric-power bus. Certain subsystems may draw a ripple current from the power source that may affect the other subsystems. Several specifications, such as MIL-STD-461, address the quantity and frequency content of ripple current that may be reflected to an electric-power bus, in addition to other requirements.

For example, in the case of certain types of sensor systems, a cryogenic cooler drive electronics system may draw up to 8 to 10 amps or more of ripple current at a nominal frequency between 35 and 100 Hz from the electric-power bus. In some applications, such as a satellite system, a large ripple-current draw may destabilize the bus and may degrade the performance of other electronics subsystems using the bus, particularly, those managing low power sensor signals. For example, in the case of a laser system that generates pulsed output energy, or a directed-energy system that generates pulses of RF energy, the current required for the pulsed output may similarly reflect back to an electric-power bus and may destabilize it.

Conventional approaches to reduce the current ripple on an electric-power bus utilize passive filters with large capacitors and inductors. However, the size and weight of these large capacitors and inductors required for low-frequency filter bandwidth make these approaches undesirable for applications where size and/or weight are important factors. Other conventional approaches include the use of shunt regulators in parallel with the load. These shunt regulators draw load current under light load conditions and reduce shunt power under system heavy load conditions keeping the net current draw from a power source somewhat constant. Although this approach may work well for relatively light fluctuating loads, it wastes power. At high power or for a large quantity of shunt regulators, the power dissipation of the shunt loads may become excessive increasing net total power draw and reducing the efficiency of the power system. AC-coupled shunt regulators are also used in conventional systems but also suffer from excessive power dissipation, and because they are AC coupled, they suffer from bandwidth limitations.

Thus, there are general needs to reduce ripple-current reflections to an electric-power bus. There are also general needs for systems and methods that control and regulate input current drawn from an electric-power bus. There are also needs for systems and methods that control and regulate input current drawn from an electric-power bus without the use of large capacitors, large inductors or shunt regulators. There are also needs for systems and methods that control and regulate input current drawn from an electric-power bus suitable for electronics systems, including ground-based, mobile, airborne, shipboard, and spacecraft-based systems.

SUMMARY

An active-power filter and method are provided that, in embodiments, controls and regulates the input current drawn from an electric-power bus. Load current fluctuations and ripple reflected back to the electric-power bus are reduced and in some embodiments, substantially eliminated. The active-power filter of some embodiments utilizes a switch-mode power converter with a very low bandwidth output voltage regulation control loop, which uses input voltage feedforward and output load feedforward to provide a regulated input current. Unlike conventional switch-mode DC power supplies which provide regulated DC output voltages, the active-power filter of embodiments of the present invention provides a regulated DC input current. Furthermore, the active-power filter of embodiments of the present invention may deliver a regulated DC output voltage.

In embodiments, current mode control is used to provide the regulated input current. Switch current is compared to an error-amplifier output to control the switch's on time. The switch current may be regulated on a cycle-by-cycle basis, to regulate input current without modulation at the frequencies which are to be attenuated. In these embodiments, a very low bandwidth control loop regulates the output voltage.

In some embodiments, the output voltage of the active-power filter may be regulated with a very low bandwidth regulation control loop to reduce output load current fluctuations from reflecting back to the electric-power bus. With a low bandwidth loop, the converter slowly responds to changes in input voltage and output load current. Input voltage feedforward and output load feedforward help maintain output voltage regulation.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
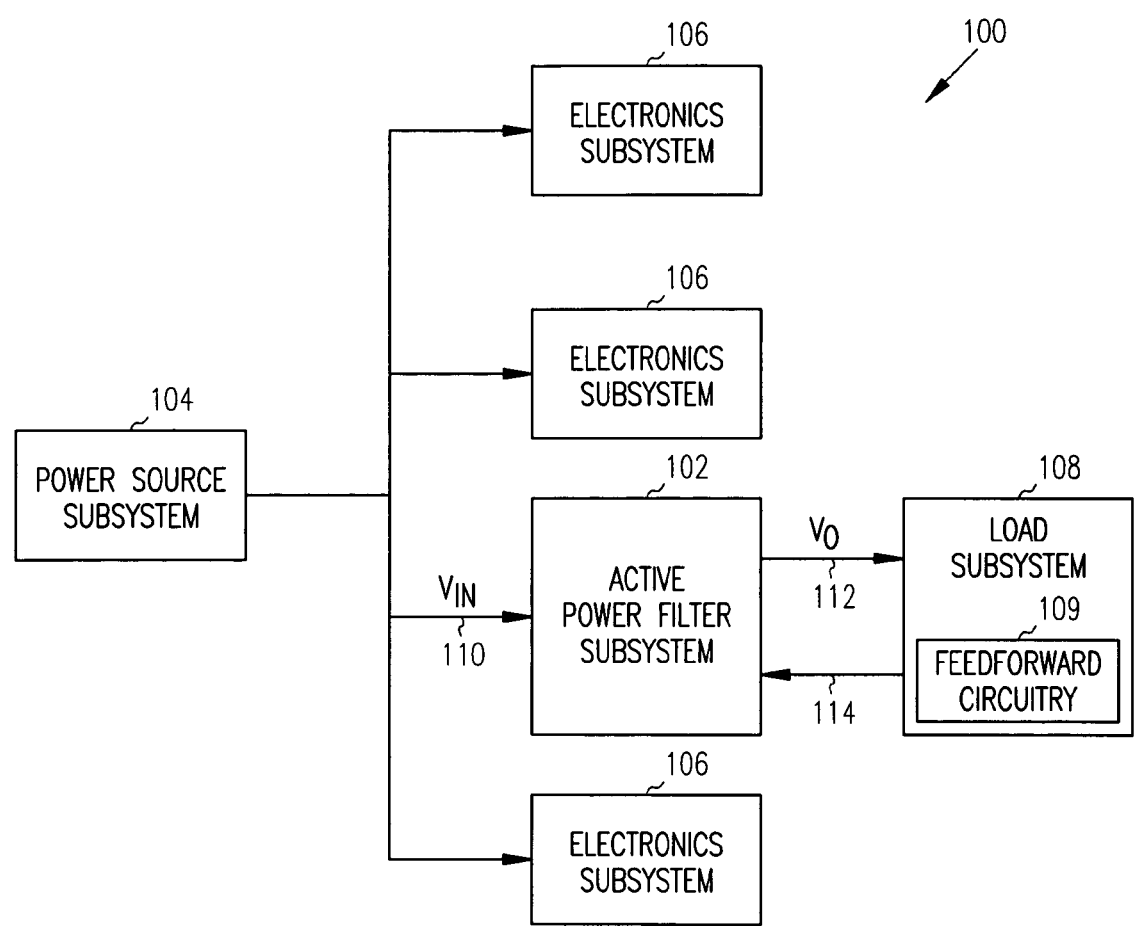
FIG. 1 is a functional block diagram of a system in accordance with some embodiments of the present invention.

FIG. 1 is a functional block diagram of a system in accordance with some embodiments of the present invention. System 100 may be an electronics power distribution system or other system that supplies power to one or more subsystems. In embodiments, one or more of subsystems of system 100 may draw a ripple current that may affect power supplied to other subsystems. Examples of system 100 include but are not limited to power systems in communication systems, radar systems, infrared-sensor systems, laser-tracking systems, or directed-energy systems. These systems may be ground-based, mobile, airborne, shipboard, or spacecraft-based systems.

System 100 includes power-source subsystem 104, active-power filter subsystem 102, load subsystem 108, and other electronics systems and subsystems 106. Power-source subsystem 104 may supply power to one or more systems and subsystems, such as electronics subsystems 106. Load subsystem 108 may be an electronics system or subsystem, an electromechanical system, or an electronics system/subsystem driving an electromechanical system. In embodiments, power-source subsystem 104 provides input current 110 to active-power filter subsystem 102 as well as input current to other systems and subsystems 106. Load subsystem 108 may draw output current 112 from active-power filter subsystem 102. In some embodiments, output current 112 may have an output-current ripple at a nominal frequency, which may range, for example, between 35 and 100 Hz, although the scope of the invention is not limited in this respect. In some embodiments, the output current ripple may range up to ten amps peak-to-peak, or greater, although the scope of the invention is not limited in this respect. Load subsystem 108 may include feedforward circuitry 109 to generate output-load feedforward signal 114. Signal 114 may indicate the relative power and/or output current 112 drawn by load subsystem 108. Alternatively, signal 114 may indicate changes in output current 112 drawn by load subsystem 108.

In accordance with some embodiments of the present invention, active-power filter subsystem 102 provides output current 112 to load subsystem 108 by regulating an output voltage (Vo) for load subsystem 108. In these embodiments, active-power filter subsystem 102 may also tightly regulate input current 110 drawn by active-power filter subsystem 102 from power-source subsystem 104 based at least in part on output-load feedforward signal 114. Active-power filter subsystem 102 may also tightly regulate input current 110 drawn by active-power filter subsystem 102 from power-source subsystem 104 based on the input voltage (Vin). Accordingly, the effects of the ripple current drawn by load subsystem 108 may have little or no effect on the input voltage supplied to other system components, such as electronics subsystems 106, by power-source subsystem 104. In some embodiments, output current 110 may be supplied by power-source subsystem 104 on a 28-volt power supply bus, although the scope of the invention is not limited in this respect.

In some embodiments, active-power filter subsystem 102 includes control circuitry to combine an error-amplifier output voltage, an input-voltage sense signal and output-load feedforward signal 114 to generate a control signal. This is described in more detail below.

In some embodiments, the control circuitry of active-power filter subsystem 102 includes an error amplifier set up as an integrator to regulate the output voltage (Vo). The integrator may have a bandwidth significantly less than frequencies desired to be attenuated to regulate the output voltage, while input current 110 drawn by active-power filter subsystem 102 may be tightly regulated. This is also described in more detail below.

In some embodiments, system 100 may comprise a satellite system, and load subsystem 108 may comprise a cryogenic-cooling system having a motor to drive a cryogenic cooling pump. In these embodiments, circuitry 109 generates output-load feedforward signal 114 indicating the relative load power or load current that the motor is anticipated to draw. Active-power filter subsystem 102 may regulate the output voltage (Vo) for the motor-drive electronics and may tightly regulate input current 110 drawn by active-power filter subsystem 102 for the motor based at least in part on output-load feedforward signal 114 and/or the input voltage (Vin).

In some other embodiments, system 100 may comprise a system for generating pulsed energy, such as laser or RF energy. In these embodiments, load subsystem 108 may comprise a laser or RF amplifier and control electronics (e.g., part of load circuitry 109), which generate output-load feedforward signal 114 indicating that the amplifier will draw either an increased or decreased amount of time-averaged output current from active-power filter subsystem 102. In these embodiments, active-power filter subsystem 102 may regulate an output voltage (Vo) for the amplifier and may tightly regulate input current 110 drawn by active-power filter subsystem 102 for the amplifier based at least in part on output-load feedforward signal 114 and/or the input voltage (Vin).

Figure 2:
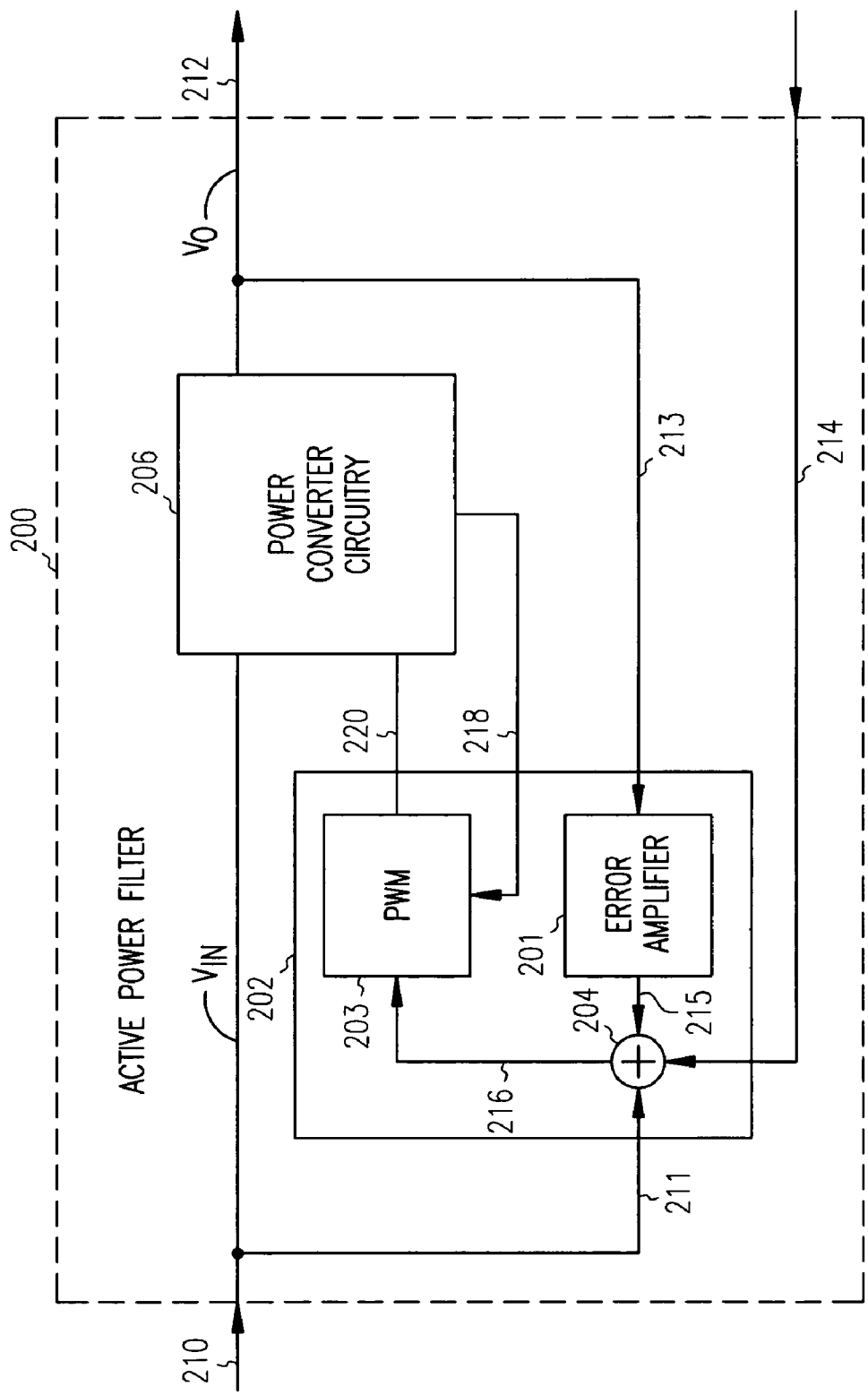
FIG. 2 is a functional block diagram of an active-power filter in accordance with some embodiments of the present invention.

FIG. 2 is a functional block diagram of an active-power filter in accordance with some embodiments of the present invention. Active-power filter 200 receives input current 210 from a power source, such as power-source subsystem 104 (FIG. 1), and provides output current 212. Active-power filter 200 may be suitable for use as active-power filter subsystem 102 (FIG. 1), although other active-power filters may also be suitable. In some embodiments, active-power filter 200 may achieve an input ripple current attenuation up to and possibly exceeding 30 dB. Active-power filter 200 includes control circuitry 202 which may include error amplifier 201 and summing element 204. Control circuitry 202 may sense output-voltage feedback signal 213 and may combine error-amplifier output voltage 215, input-voltage feedforward signal 211, and output-load feedforward signal 214 to generate control signal 216. Control signal 216 may be compared to current-sense signal 218 to generate current-regulation signal 220 which may be used by power converter circuitry 206 to regulate input current 210 on a cycle-by-cycle basis.

Control signal 216 may be generated by summing element 204 and may be a summation of error-amplifier output voltage 215, input-voltage feedforward signal 211, and output-load feedforward signal 214. In some embodiments, the signal inputs may be scaled and weighted as illustrated in the following equation:

$$VE=K1*VA+K2*VIN+K3*IFF+K4$$

In the above equation, K1, K2, K3, and K4 are weighting constants, VA corresponds to error-amplifier output voltage 215, VIN corresponds to input voltage (Vin), and IFF corresponds to output-load feedforward signal 214. The constants K2 and K4 may be positive or negative.

In some embodiments, active-power filter 200 may be implemented without current mode control (e.g., using voltage mode control). Without current mode control, input current 210 may be controlled as a second order effect by a very slow response of error amplifier 201. Ripple current reflected back to an electric-power bus may be reduced, but input current 210 would not necessarily be regulated.

In embodiments, output-load feedforward signal 214 may be provided by circuitry of an output-load subsystem, such as subsystem 108 (FIG. 1) that receives output current 212. Output-load feedforward signal 214 may indicate the relative output power or output current drawn by the load subsystem.

In some embodiments, active-power filter 200 may be implemented without load-current feedforward which may result in some loss in performance. Without load-current feedforward, the output voltage (Vo) is regulated, but the regulation may suffer in response to load changes. This may be desirable in some situations to help reduce output-current transients reflected back to input current 210.

In some embodiments, control circuitry 202 may include a pulse-width-modulator (PWM) 203 for comparing control signal 216 with current-sense signal 218 to generate current-regulation signal 220 for power converter circuitry 206. In these embodiments, current-regulation signal 220 may comprise switching signals in which the duty cycle of the switching signals may be modulated based, at least in part, on a difference between control signal 216 and current-sense signal 218.

Active-power filter 200 may also comprise power converter circuitry 206 to draw input current 210 and provide output current 212 based at least in part on current-regulation signal 220. Power converter circuitry 206 may comprise either an isolated power converter, such as a flyback, forward, push-pull, or full-bridge power converter, or a non-isolated power converter, such as a boost, buck, buck-boost, or tapped-buck power converter, although the scope of the invention is not limited in this respect.

Figure 3:
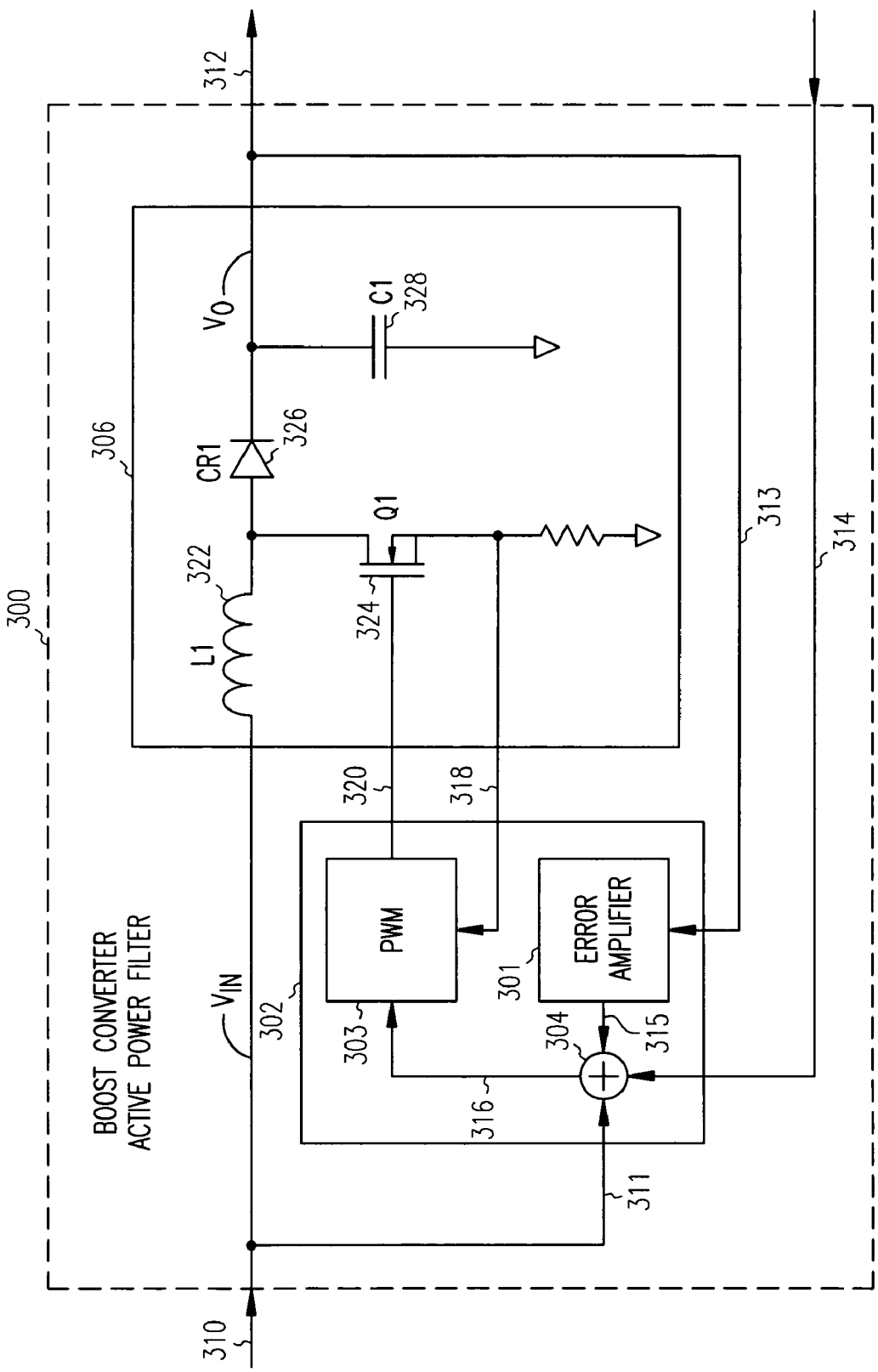
FIG. 3 is a functional block diagram of an active-power filter in accordance with some embodiments of the present invention.

FIG. 3 is a functional block diagram of an active-power filter in accordance with some embodiments of the present invention. Active-power filter 300 may utilize a non-isolated continuous-current boost converter, although the scope of the invention is not limited in this respect. Active-power filter 300 may be suitable for use as active-power filter subsystem 102 (FIG. 1), although other active-power filters may also be suitable. Active-power filter 300 comprises control circuitry 302 and power converter circuitry 306. Control circuitry 302 may include error amplifier 301, summing element 304, and PWM 303. Active-power filter 300 draws input current 310 from a power source, such as power-source subsystem 104 (FIG. 1), and provides output current 312. In some embodiments, active-power filter 300 may achieve an input ripple current attenuation up to and exceeding 30 dB. In embodiments, control circuitry 302 regulates output-voltage feedback signal 313. Control circuitry 302 may include summing element 304 which combines error-amplifier output voltage 315, input-voltage feedforward signal 311, and output-load feedforward signal 314 to generate control signal 316. Control signal 316 may be compared to current-sense signal 318 to help regulate input current 310 on a cycle-by-cycle basis.

Power converter circuitry 306 may comprise inductive element 322 and switching element 324 responsive to switching signal 320, to draw input current 310 through inductive element 322 while the switching element is conducting. Power converter circuitry 306 may also comprise output-rectifying element 326 to conduct current from inductive element 322 while switching element 324 is not conducting. Power converter circuitry 306 may also comprise charge-storage element 328 to store charge from current conducted through rectifying element 326 for providing output current 312.

In embodiments, output-rectifying element 326 may comprise a diode, such as a silicon carbide (SiC) Schottky diode, although the scope of the invention is not limited in this respect. In embodiments, inductive element 322 may comprise one or more inductors and charge-storage element 328 may comprise one or more capacitors, although the scope of the invention is not limited in this respect. In embodiments, switching element 324 may comprise one or more switches or switching transistors, such as N-channel MOSFETs, although the scope of the invention is not limited in this respect.

Current-sense signal 318 may be proportional to an amount of current drawn through switching element 324, output-voltage feedback signal 313 maybe proportional to the output voltage (Vo), input-voltage feedforward signal 311 may be proportional to the input voltage (Vin), and output-load feedforward signal 314 may be proportional to the amount of power or current drawn by an output-load subsystem.

In some embodiments, active-power filter 300 may be a current-mode control converter which regulates current through switching element 324 on a cycle-by-cycle basis using current-sense signal 318 to tightly regulate input current 310 thereby reducing input-current ripple. In these embodiments, active-power filter 200 may also regulate the output voltage (Vo) with a low or very low bandwidth output-voltage regulation-control loop to help ensure that the error-amplifier output (e.g. signal 316) does not modulate at frequencies desired to be attenuated. Although active-power filter 300 is illustrated as a continuous-current boost converter, the scope of the invention is not limited in this respect.

In some embodiments in which active-power filter 300 includes a low or very low-bandwidth control loop for helping to regulate the output voltage (Vo), a high-bandwidth current-sense signal may be used to tightly regulate input current 310 using current-mode control. In these embodiments, control circuitry 302 may implement the control loops with an integrating-error amplifier that receives output-voltage feedback signal 313. The integrating-error amplifier may combine error-amplifier output voltage 315 with input-voltage feedforward signal 311 and output-load feedforward signal 314 to generate control signal 316. PWM 303 may further implement the control loops by comparing control signal 316 with current-sense signal 318 to help control the current drawn by switching element 324.

In some embodiments of active-power filter 300, weighting constants may be calculated to provide an optimum response to input-voltage changes and output-load changes. For example, the weighting constant for input-voltage feedforward signal 311 may be calculated assuming that for a given output load, input current 310 changes as a function of the input voltage. Assuming the use of current mode control for this example, control voltage 316 may vary as a function of input voltage. Assuming further for calculation purposes that error-amplifier output voltage 315 does not change, and that output-load feedforward signal 314 does not change, then input-voltage feedforward signal 311 may vary as calculated. Input-voltage feedforward signal 311 may then be scaled to provide this calculated variation.

A weighting constant for output-load feedforward signal 314 may be calculated assuming that for a given input voltage, the input current changes as a function of the output load. Assuming again the use of current-mode control, control voltage 316 may vary as a function of output-load current. Assuming further for calculation purposes that error-amplifier output voltage 315 does not change, and that input-voltage feedforward signal 311 does not change, then output-load feedforward signal 314 may vary as calculated. Output-load feedforward signal 314 may then be scaled to provide this calculated variation. In some embodiments, a DC offset may be added to signal 314 to set the error-amplifier output in a desired voltage range.

As can be seen from examination of active-power filter 300, when input current 310 is a regulated DC input current, the current in output-rectifying element 326 may be regulated at a fixed level proportional to the input current 310 and the operating duty cycle. Also, for a fixed current in output-rectifying element 326 and output current 312 having significant ripple current, the difference between the current in output-rectifying element 326 and output-load current 312 is provided by charge-storage element 328, depending on the relative levels between the two currents. Output-voltage ripple may be a function of the ripple current and the output capacitance. In some embodiments, charge-storage element 328 may provide a sufficient amount of output capacitance to maintain a sufficiently low amount of output-ripple voltage. In some embodiments of the present invention, this output ripple voltage may be allowed to be a significant fraction of the DC output voltage when it is at or about the frequency of the load ripple.

Although system 100, active-power filter 200, and active-power filter 300 are illustrated as having several separate functional elements, one or more of the functional elements may be combined and may be implemented by combinations of elements for performing at least the functions described herein.

Figure 4:
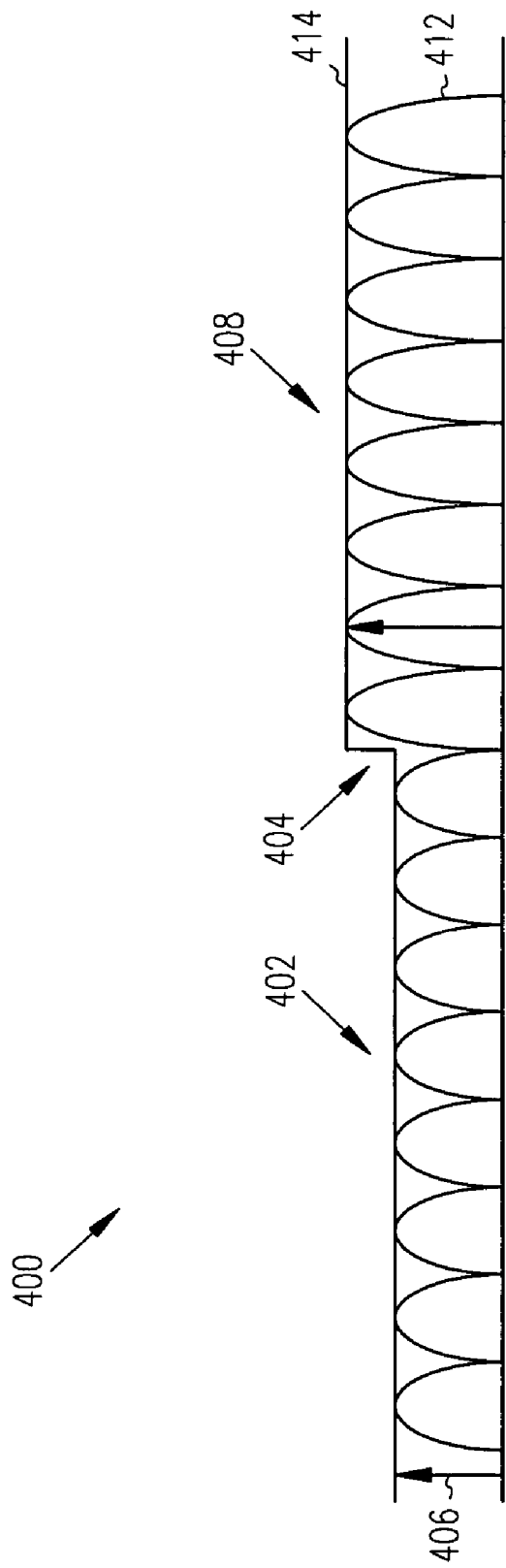
FIG. 4 illustrates an output-load feedforward signal and output load current in accordance with some embodiments of the present invention.

FIG. 4 illustrates an output-load feedforward signal and output-load current in accordance with some embodiments of the present invention. Waveforms 400 include output-load feedforward signal 414 and output-current waveform 412. Output-load feedforward signal 414 may correspond to output-load feedforward signal 114 (FIG. 1), output-load feedforward signal 214 (FIG. 2), and/or output-load feedforward signal 314 (FIG. 3). Output-current waveform 412 may correspond to output current 112 (FIG. 1), output current 212 (FIG. 2), and/or output current 312 (FIG. 3). In accordance with some embodiments of the present invention, output-load feedforward signal 414 indicates the relative power or load current drawn by the load subsystem such as subsystem 108 (FIG. 1). In some embodiments, output-load feedforward signal 414 may indicate when current drawn by an output-load subsystem, such as subsystem 108 (FIG. 1), changes or is anticipated to change. In some embodiments, output-load feedforward signal 414 may be viewed as a modulation envelope of output-current waveform 412. A step function load increase is illustrated for clarity, although the scope of the invention is not limited in this respect.

During time 402, output-load feedforward signal 414 may indicate lower current draw 406 of output-current waveform 412. During time 408, output-load feedforward signal 414 may indicate greater current draw 410 of output-current waveform 412. In accordance with some embodiments, output-load feedforward signal 414 indicates an increase in output-current waveform 412 at time 404. In some embodiments, output-load feedforward signal 414 may change its value just prior to the change in output-current waveform 412, allowing an active-power filter to respond to an anticipated increase or decrease in current to be drawn by a load subsystem. In some embodiments, the change in the level of output-load feedforward signal 414 may be proportional to the anticipated or actual change in the current draw by the load subsystem.

Figure 5:
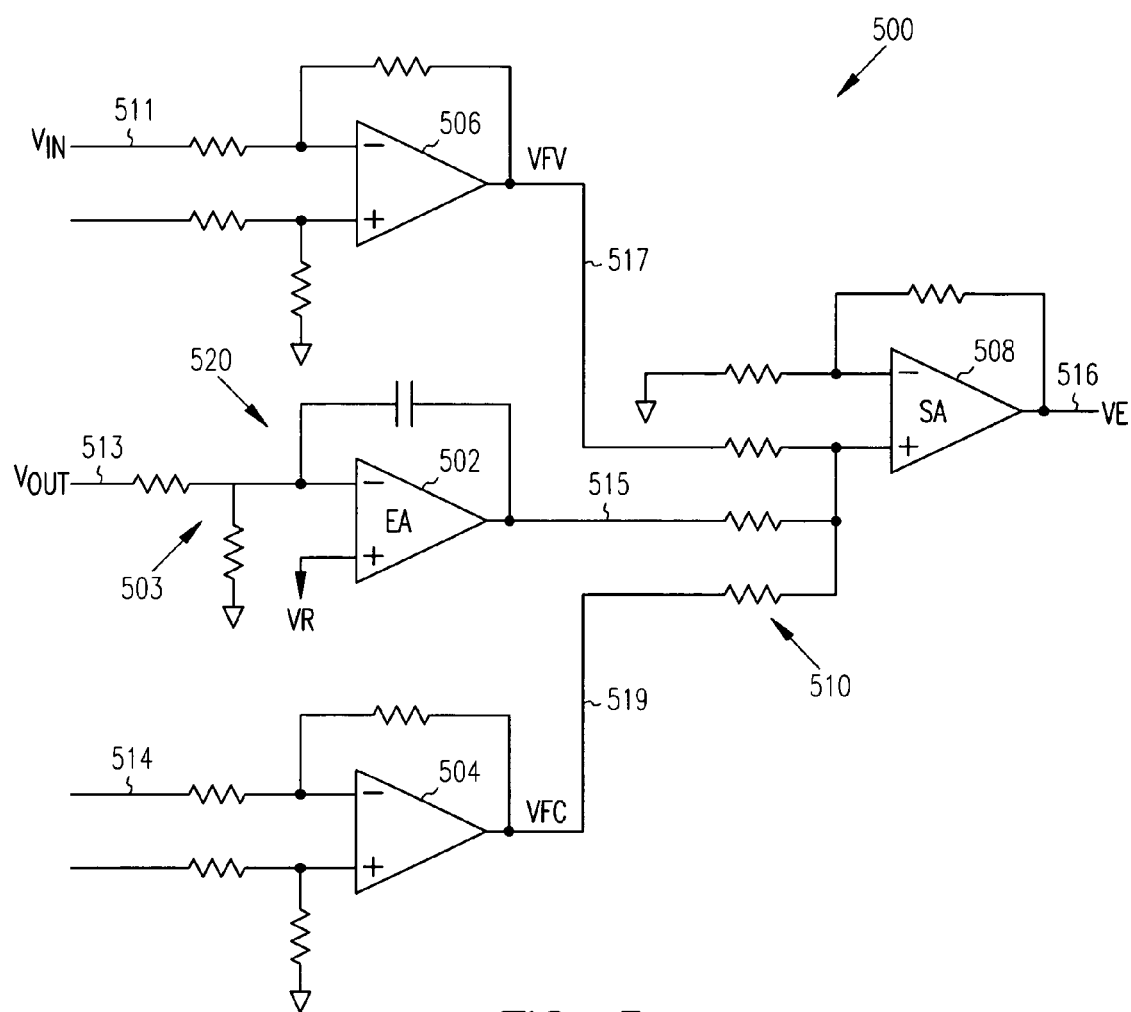
FIG. 5 is a circuit diagram of control circuitry in accordance with some embodiments of the present invention.

FIG. 5 is a circuit diagram of control circuitry in accordance with some embodiments of the present invention. Control circuitry 500 may be suitable for use as part of control circuitry 202 (FIG. 2) and/or part of control circuitry 302 (FIG. 3), although other circuitry may also be suitable. In embodiments, control circuitry 500 may comprise error amplifier 502 and associated circuitry 520 to integrate output-voltage sense signal 513, and summing amplifier 508 to sum error-amplifier output signal 515 with input-voltage sense signal 511 and output-load feedforward signal 514 to generate error voltage 516.

In some embodiments, output-voltage sense signal 513 may correspond to output-voltage feedback signal 213 (FIG. 2), input-voltage sense signal 511 may correspond to input-voltage feedforward signal 211 (FIG. 2), output-load feedforward signal 514 may correspond to output-load feedforward signal 212 (FIG. 2), error-amplifier output signal 515 may correspond to error-amplifier output voltage 215 (FIG. 2), and error voltage 516 may correspond to control signal 216 (FIG. 2).

In some embodiments, output-voltage sense signal 513 may correspond to output-voltage feedback signal 313 (FIG. 3), input-voltage sense signal 511 may correspond to input-voltage feedforward signal 311 (FIG. 3), output-load feedforward signal 514 may correspond to output-load feedforward signal 312 (FIG. 3), error-amplifier output signal 515 may correspond to error-amplifier output voltage 315 (FIG. 3), and error voltage 516 may correspond to control signal 316 (FIG. 3).

In some embodiments, control circuitry 500 further comprises circuit elements 510, such as resistors, to weight or change the relative contribution of signals 515, 517 and 519 to the output of the summing amplifier 508. The selection of the weightings may depend on many factors including system dynamics.

In some embodiments, control circuitry 500 may also comprise output-load feedforward signal amplifier 504 to amplify, scale, or offset output-load feedforward signal 514 prior to summing by summing amplifier 508, although the scope of the invention is not limited in this respect. In some embodiments, control circuitry 500 may also comprise input-voltage sense-signal amplifier 506 to amplify, scale, or offset input-voltage sense signal 511 prior to summing by summing amplifier 508, although the scope of the invention is not limited in this respect.

In some embodiments, associated circuitry 520 of error amplifier 502 may have their values selected to provide a bandwidth of the feedback loop that is significantly less than the nominal frequency of the current ripple of the load subsystem. This may be done to help ensure that the error-amplifier output does not modulate at the frequencies desired to be attenuated. A control-loop bandwidth may be chosen to be, for example, on the order of 1/10 to 1/30 of the lowest frequency to be attenuated. This may provide a control-loop gain of −20 dB to −30 dB at that frequency, with a resulting ripple attenuation of approximately −20 dB to −30 dB respectively. For a given set of values of inductive element 322 (FIG. 3) and charge-storage element 328 (FIG. 3), there may be a practical limit of attenuation possible. For more attenuation, either inductance or capacitance may be increased, or both may be increased. Thus, a very low-bandwidth control loop may be used to regulate output voltage to achieve ripple attenuation.

Accordingly, error-amplifier output signal 515 may be slow to react to changes in the output voltage of an active-power filter, resulting in a possible loss of output-voltage regulation in the case of input-voltage transients or output-load transients. Input-voltage feedforward and output-load feedforward may help maintain output voltage regulation. Summing input-voltage sense signal 511 and output-load feedforward signal 514 to the error-amplifier output voltage by means of summing amplifier 508 allows equivalent error voltage 516 to change as rapidly as either the input voltage changes or output load changes, allowing the active-power filter to maintain regulation of the output voltage.

Figure 6:
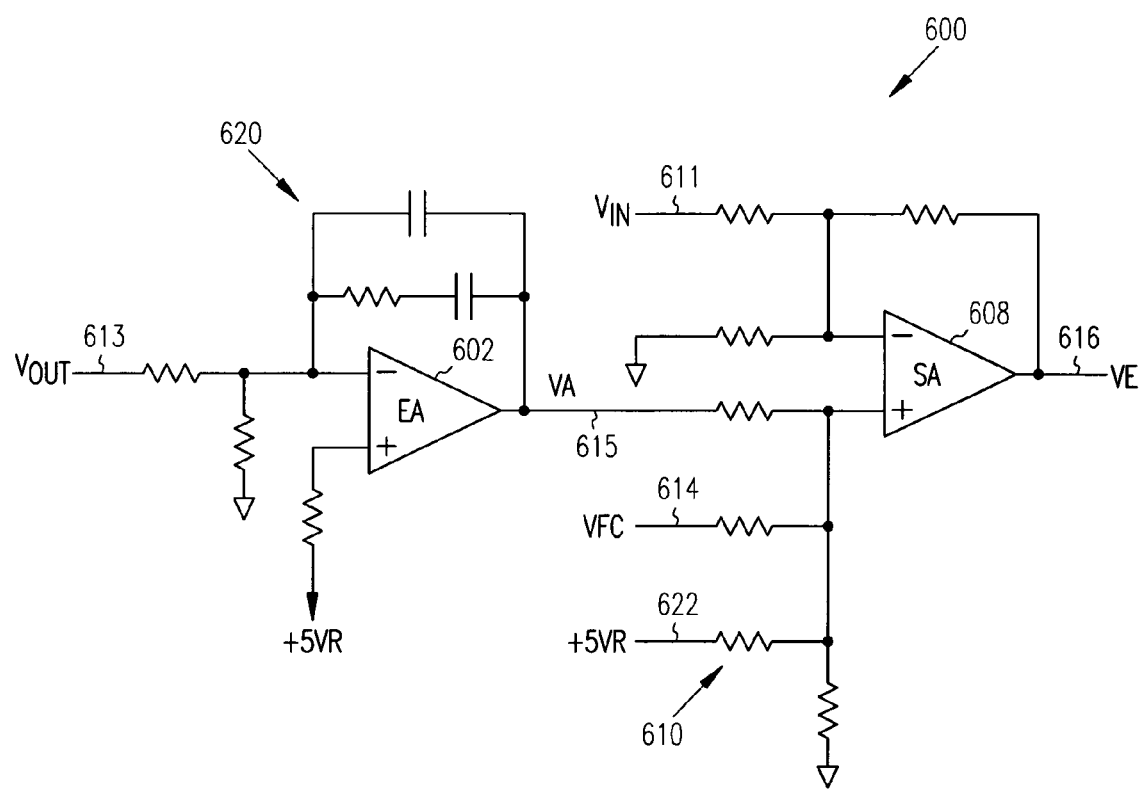
FIG. 6 is a circuit diagram of control circuitry in accordance with some other embodiments of the present invention.

FIG. 6 is a circuit diagram of control circuitry in accordance with some other embodiments of the present invention. Control circuitry 600 may be suitable for use as control circuitry 202 (FIG. 2) and/or 302 (FIG. 3), although other circuitry may also be suitable. In embodiments, control circuitry 600 may comprise error amplifier 602 and associated circuitry 620 to integrate output-voltage sense signal 613, and summing amplifier 608 to sum error-amplifier output voltage 615 with input-voltage sense signal 611 and output-load feedforward signal 614 to generate error voltage 616.

In some embodiments, output-voltage sense signal 613 may correspond to output-voltage feedback signal 213 (FIG. 2), input-voltage sense signal 611 may correspond to input-voltage feedforward signal 211 (FIG. 2), output-load feedforward signal 614 may correspond to output-load feedforward signal 212 (FIG. 2), and error voltage 616 may correspond to control signal 216 (FIG. 2).

In some other embodiments, output-voltage sense signal 613 may correspond to output-voltage feedback signal 313 (FIG. 3), input-voltage sense signal 611 may correspond to input-voltage feedforward signal 311 (FIG. 3), output-load feedforward signal 614 may correspond to output-load feedforward signal 312 (FIG. 3), and error voltage 616 may correspond to control signal 316 (FIG. 3).

In some embodiments, control circuitry 600 further comprises circuit elements 610, such as resistors, to weight or change the signal levels of the error-amplifier output voltage 615, input-voltage sense signal 611, and output-load feedforward signal 614 prior to summing by summing amplifier 608. In these embodiments, the weighting of the feedforward signals may require the loading of each feedforward signal on the other, and that the loading of the error-amplifier output on the feedforward signals be taken into account for an optimum response. In these embodiments, output-load feedforward signal 614 may be offset with reference voltage 622 (VR), although the scope in the invention is not limited in this respect. Reference voltage 622 may be a five-volt reference although other voltage references are also suitable.

In embodiments, associated circuitry 620 of error amplifier 602 may have their values selected to perform an integration of output-voltage sense signal 613 to provide a bandwidth of the feedback loop significantly less than the nominal frequency of the current ripple desired to be attenuated. This may be done to ensure that the error-amplifier output does not modulate at the frequencies desired to be attenuated. A control loop bandwidth may be chosen to be on the order of 1/10 to 1/30 of the lowest frequency to be attenuated. Accordingly, signal 615 may be slow to react to changes in the output voltage of an active-power filter, thus possibly loosing regulation of the output voltage (Vo) in the case of input voltage transients or output load transients. Input-voltage feedforward and output-load feedforward may help maintain output-voltage regulation. Summing input-voltage sense signal 611 and output-load feedforward signal 614 to the error-amplifier output voltage 615 allows error voltage 616 to change as rapidly as either the input voltage changes or output load changes, allowing an active-power filter to maintain regulation of its output voltage.

Figure 7:
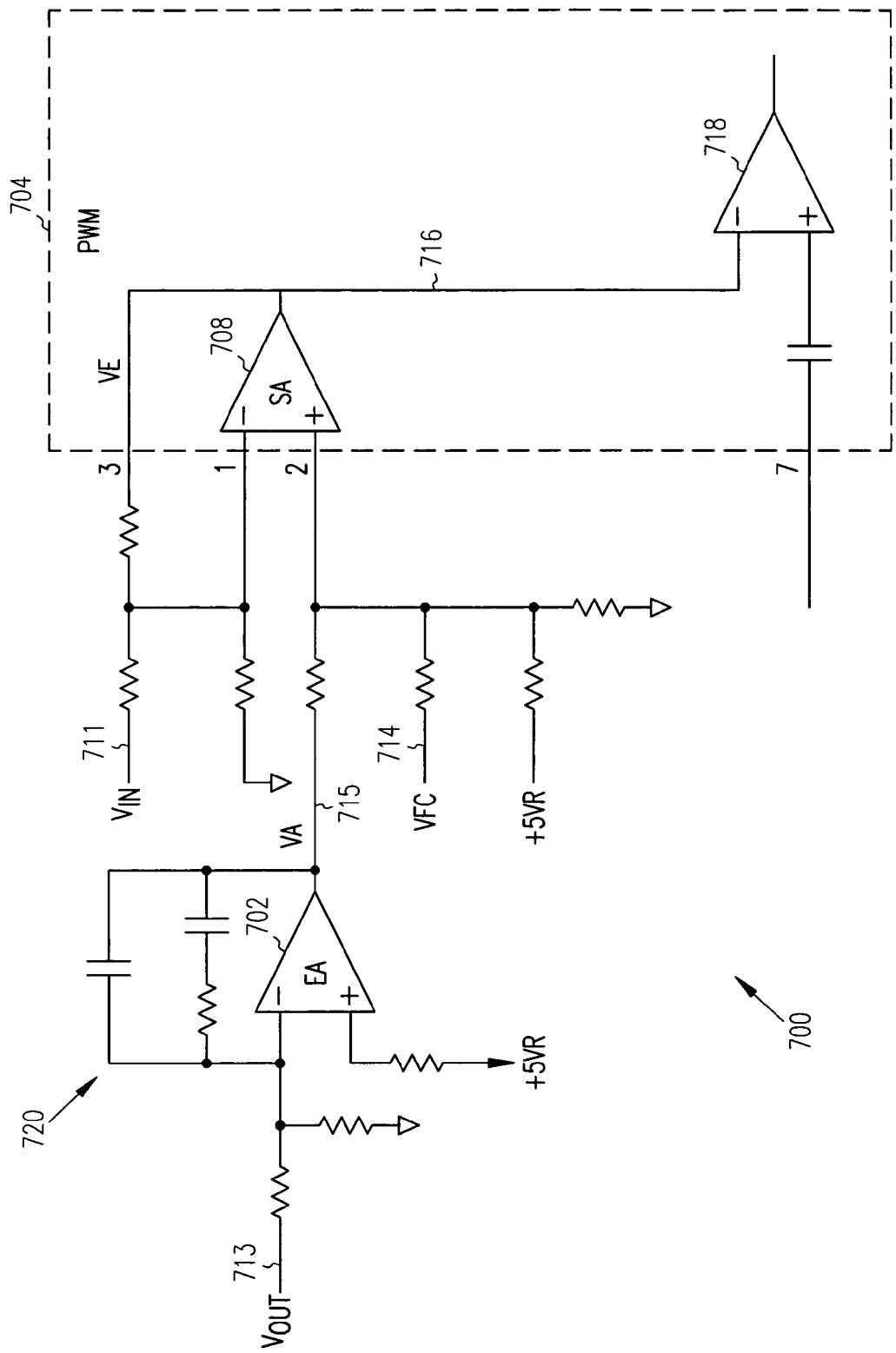
FIG. 7 is a circuit diagram of control circuitry in accordance with some other embodiments of the present invention.

FIG. 7 is a circuit diagram of control circuitry in accordance with some other embodiments of the present invention. Control circuitry 700 may be suitable for use as control circuitry 202 (FIG. 2) and/or 302 (FIG. 3), although other circuitry may also be suitable. In embodiments, control circuitry 700 may comprise error amplifier 702 and associated circuitry 720 to integrate output-voltage sense signal 713 and internal-summing amplifier 708 to sum error-amplifier output voltage 715 with input-voltage sense signal 711 and output-load feedforward signal 714 to generate error voltage 716.

In some embodiments, circuitry 700 may include PWM 704 which may include internal-summing amplifier 708 which may be used for the summing amplifier of the control circuitry. PWM 704 may correspond with PWM 203 (FIG. 2) and/or 303 (FIG. 3). In some embodiment, a PWM, such as a standard UC1823 PWM, may be used for PWM 704 although the scope of the invention is not limited in this respect. PWM 704 may be used with either voltage-mode control or current-mode control.

In the case of a standard PWM, internal-error amplifier 708 may be used as the summing amplifier 608 when all three pins of the error amplifier are available for use. In some embodiments, pin 1 of PWM 704 may be used as the inverting input to summing amplifier 708; pin 2 may be used as the non-inverting input to summing amplifier 708; pin 3 may be used as the output pin of summing amplifier 708. The summing-amplifier output on pin 3 may be internally tied to the input of comparator 718 which may be available for current-mode control. An external op-amp may be added for use as the error amplifier 702.

Figure 8:
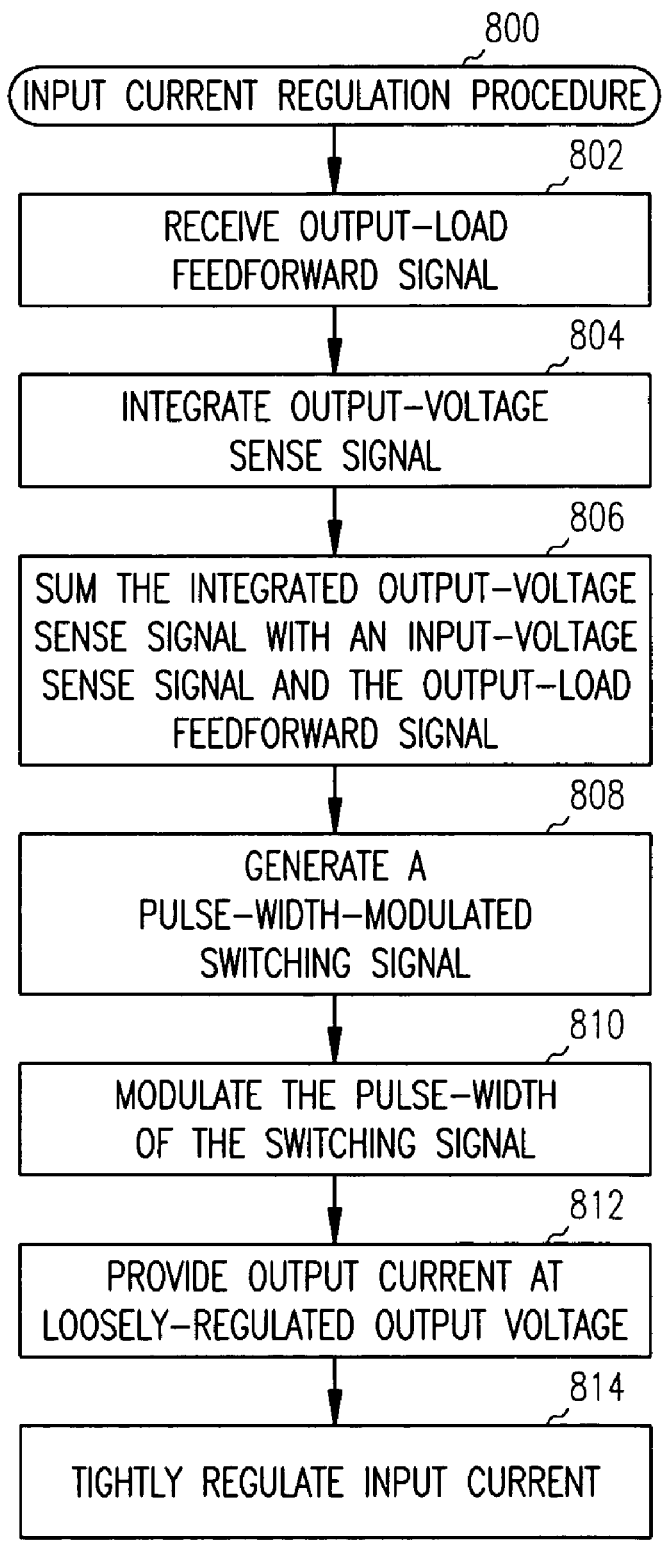
FIG. 8 is a flow chart of an input-current regulation procedure in accordance with some embodiments of the present invention.

FIG. 8 is a flow chart of an input-current regulation procedure in accordance with some embodiments of the present invention. Input-current regulation procedure 800 may be performed by an active-power filter, such as active-power filter subsystem 102 (FIG. 1), although other active-power filters may also be suitable. Procedure 800 may be used to tightly regulate an input current drawn by the active-power filter and loosely regulate an output voltage provided to a load, such as load subsystem 108 (FIG. 1).

Operation 802 receives an output-load feedforward signal, such a signal 214 (FIG. 2), indicating when current drawn by the output-load subsystem will change. Operation 804 integrates an output-voltage sense signal, such as signal 213 (FIG. 2) or signal 313 (FIG. 3). The output-voltage sense signal may indicate the output voltage of the active-power filter.

Operation 806 sums the integrated output-voltage sense signal with the input-voltage sense signal, such as signal 211

(FIG. 2) or signal 311 (FIG. 3), and the output-load feedforward signal is used to generate a control signal, such as control signal 216 or control signal 316 (FIG. 3), for controlling current drawn by the power converter. The input-voltage sense signal may indicate the input voltage of the power converter.

Operation 808 generates a pulse-width-modulated switching signal which may switch-on and switch-off a switching element of the active-power filter. In embodiments, the switching element draws input current when conducting.

Operation 810 may modulate the pulse-width of the switching signal based on the control signal and a current-sense signal. The current-sense signal may correspond to current-sense signal 218 (FIG. 2) or current-sense signal 318 (FIG. 3) indicating an amount of current drawn through a switching element, such as switching element 324 (FIG. 3).

Operation 812 may provide output current, such as output current 212 (FIG. 2) or output current 313 (FIG. 3), to a load subsystem which draws the output current with an output current ripple at a nominal frequency. In operation 814, the input current drawn may be tightly regulated while the output voltage may be loosely regulated.

Thus, systems, active-power filters, and methods for regulating at least input current have been described. In some embodiments, an input-ripple current attenuation exceeding 30 dB may be achieved.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. An active-power filter to regulate a DC input current drawn from a DC power source comprising:
   control circuitry to combine an integrated output-voltage sense signal, an input-voltage sense signal and an output-load feedforward signal to generate a control signal; and
   power converter circuitry to regulate ripple in the DC input current based at least in part on the control signal,
   wherein the output-load feedforward signal is generated by internal circuitry of an output-load subsystem which draws DC output current through the active power filter, and
   wherein the ripple in the DC input current produced by changes in the DC output current drawn by the output-load subsystem is reduced by operation of the control circuitry and the power converter circuitry.

2. The active-power filter of claim 1 wherein the output-load feedforward signal is generated by the internal circuitry of the output-load subsystem to indicate when one of either relative power or the DC output current changes,
   wherein the output-voltage sense signal is measured within the active power filter and is proportional to an output voltage of the active power filter, and
   wherein the output-load feedforward signal is separate from the output-voltage sense signal and is generated by the output-load subsystem.

3. The active-power filter of claim 1 wherein the output-load feedforward signal indicates that one of either relative power or the DC output current drawn by the output-load subsystem will change.

4. The active-power filter of claim 1 wherein the control circuitry includes an integrator to integrate a difference between the output-voltage sense signal and a reference signal,
   wherein the output-load subsystem draws the DC output current from the power converter circuitry having an output current ripple at a nominal ripple frequency, and
   wherein components of the integrator are selected to provide a control-loop bandwidth significantly less than the nominal ripple frequency.

5. The active-power filter of claim 1 wherein the control circuitry comprises:
   an error amplifier to integrate a difference between the output-voltage sense signal and a reference voltage; and
   a summing amplifier to sum the integrated output-voltage sense signal with the input-voltage sense signal and the output-load feedforward signal to generate an error voltage corresponding to the control signal.

6. The active-power filter of claim 5 wherein the control circuitry further comprises circuitry to weight the integrated output-voltage sense signal, the input-voltage sense signal and the output-load feedforward signal prior to summing by the summing amplifier.

7. An active-power filter comprising:
   control circuitry to combine an integrated output-voltage sense signal, an input-voltage sense signal and an output-load feedforward signal to generate a control signal; and
   power converter circuitry to regulate a DC input current based at least in part on the control signal,
   wherein the output-load feedforward signal is a separate control signal generated by internal circuitry of an output-load subsystem which draws output current from the active power filter,
   wherein the control circuitry includes an integrator to integrate a difference between the output-voltage sense signal and a reference signal,
   wherein the output-load subsystem draws the output current from the power converter circuitry having an output current ripple at a nominal ripple frequency,
   wherein components of the integrator are selected to provide a control-loop bandwidth significantly less than the nominal ripple frequency, and
   wherein the control circuitry further comprises:
   an output-load feedforward signal amplifier to amplify the output-load feedforward signal prior to summing by the summing amplifier; and
   an input-voltage sense signal amplifier to amplify the input-voltage sense signal prior to summing by the summing amplifier.

8. The active-power filter of claim 2 wherein the control circuitry comprises a pulse-width-modulator (PWM) for comparing the control signal with a current-sense signal to generate a switching signal for the power converter circuitry, a pulse-width of the switching signal being modulated signal based, at least in part, on a difference between the control signal and the current-sense signal.

9. The active-power filter of claim 8 wherein the power converter circuitry receives the DC input current and provides the DC output current to the output-load subsystem based at least in part on the switching signal.

10. The active-power filter of claim 9 wherein the power converter circuitry comprises:
an inductive element to receive an input current;
a switching element responsive to the switching signal to draw the DC input current through the inductive element while the switching element is conducting;
an output-rectifying element to draw current from the inductive element while the switching element is not conducting; and
a charge-storage element to store charge from current received through the rectifying element for providing the DC output current to the output-load subsystem.

11. The active-power filter of claim 9 wherein the power converter circuitry operates as a current mode converter which regulates current through a switching element on a cycle-by-cycle basis using the current-sense signal to tightly regulate the ripple in the DC input current and loosely regulate an output voltage.

12. The active-power filter of claim 2 wherein:
the current-sense signal indicates an amount of current drawn through a switching element;
the output-voltage sense signal indicates the output voltage;
the input-voltage sense signal indicates an input voltage of the power converter; and
the output-load feedforward signal indicates that the DC output current drawn by the output-load subsystem will change.

13. A method of regulating a DC input current drawn from a DC power source by an active-power filter, the method comprising:
integrating an output-voltage sense signal, the output-voltage sense signal indicating a DC output voltage; and
summing the integrated output-voltage sense signal with an input-voltage sense signal and an output-load feedforward signal to generate a control signal for controlling ripple in the DC input current drawn by the active-power filter,
wherein the output-load feedforward signal indicates when DC output current drawn by a load subsystem will change, and the input-voltage sense signal indicates an input voltage of the active-power filter,
wherein the output-load feedforward signal is a separate control signal generated by internal circuitry of the load subsystem, and
wherein the ripple in the DC input current produced by changes in the DC output current drawn by the load subsystem is reduced by the integrating and summing performed by the active power filter.

14. The method of claim 13 further comprising:
receiving the output-load feedforward signal from the load subsystem;
generating a switching signal switch-on and switch-off a switching element, wherein the switching element draws the DC input current when conducting; and
modulating a pulse-width of the switching signal based on the control signal and a current-sense signal, the current-sense signal indicating an amount of current drawn through switching element.

15. The method of claim 14 further comprising providing, by the active-power filter, the DC output current to the load subsystem which draws the DC output current with an output current ripple at a nominal frequency, wherein the ripple in the DC input current drawn by the active-power filter is tightly regulated and the DC output voltage is loosely regulated.

16. An active-power filter for regulating a DC input current drawn from a DC power source comprising:
a low-bandwidth control loop for loosely regulating a DC output voltage to an output-load subsystem; and
a high-bandwidth input control loop to tightly regulate the ripple in the DC input current using current-mode control using an output-load feedforward signal generated by internal circuitry of the output-load subsystem, the output-load feedforward signal being separate from the output voltage,
wherein the ripple in the DC input current produced by changes in DC output current drawn by the output-load subsystem is reduced by operation of the high-bandwidth input control loop.

17. The active-power filter of claim 16 comprising:
control circuitry to implement the control loops by combining an integrated output voltage with an input voltage signal and the output-load feedforward signal, and to generate a control signal; and
switching-signal generation circuitry to further implement the control loops by providing a switching signal based on the control signal and a current-sense signal.

18. The active-power filter of claim 17 wherein:
the output-load feedforward signal indicates when the DC output current drawn by the output-load subsystem changes, the output-load subsystem drawing the DC output current from the active-power filter, and
the current-sense signal indicates an amount of current drawn through a switching element of the power converter.

19. A system comprising:
a load subsystem to draw DC output current and having internal circuitry to generate an output-load feedforward signal to indicate changes in the DC output current drawn by the load subsystem; and
an active-power filter to draw DC input current from a DC power source and to provide the DC output current to the load subsystem by loosely regulating an output voltage for the load subsystem, the active-power filter to tightly regulate ripple in the DC input current drawn by the active-power filter from the DC power source based at least in part on the output-load feedforward signal,
wherein the output-load feedforward signal is separate from the output voltage, and
wherein the ripple in the DC input current produced by changes in DC output current drawn by the output-load subsystem is reduced by operation of the active power filter.

20. The system of claim 19 wherein the active-power filter comprises:
control circuitry to combine an integrated output-voltage sense signal, an input-voltage sense signal and the output-load feedforward signal to generate a control signal; and
switching-signal generation circuitry to provide a pulse-width-modulated switching signal to a switching element based on the control signal and a current-sense signal.

21. A system comprising:
a load subsystem to draw output current and having internal circuitry to generate an output-load feedforward signal to indicate changes in the output current drawn by the load subsystem; and an active-power filter to provide the output current to the load subsystem by loosely regulating an output voltage for the load subsystem, the active-power filter to tightly regulate DC input current drawn by the active-power filter based at least in part on the output-load feedforward signal, wherein the active-power filter comprises:

control circuitry to combine an integrated output-voltage sense signal, an input-voltage sense signal and the output-load feedforward signal to generate a control signal; and switching-signal generation circuitry to provide a pulse-width-modulated switching signal to a switching element based on the control signal and a current-sense signal, wherein the output-load feedforward signal is separate from the output voltage, wherein the control circuitry includes an integrator to integrate the output-voltage sense signal, and wherein the output current is drawn by the load subsystem with a current ripple having a nominal ripple frequency, and wherein components of the integrator are selected to provide a control loop bandwidth significantly less than the nominal ripple frequency to tightly regulate the input current.

22. The system of claim 21 wherein the power converter circuitry operates as current mode converter which regulates current through a switching element on a cycle-by-cycle basis using current-sense signal to tightly regulate the input current and loosely regulate an output voltage.

23. The system of claim 22 wherein:

the current-sense signal indicates an amount of current drawn through a switching element;

the output-voltage sense signal indicates the output voltage;

the input-voltage sense signal indicates an input voltage of the power converter; and the output-load feedforward signal indicates that current drawn by the output-load subsystem will change.

24. The system of claim 21 wherein the system comprises a satellite system and the load subsystem comprises a cryogenic cooling system having a motor to drive a cryogenic-cooling pump, wherein the circuitry generates the output-load feedforward signal indicating that the motor will draw current, and wherein the active-power filter loosely regulates an output voltage for the motor and tightly regulates the input current drawn by the active-power filter based at least in part on the output-load feedforward signal.

25. The system of claim 21 wherein the system comprises a system for generating pulsed energy, wherein the load subsystem comprises one or either a laser or RF amplifier and firing electronics which generate the output-load feedforward signal indicating that the amplifier will draw an increased or decreased current, and wherein the active-power filter loosely regulates an output voltage for the amplifier and tightly regulates the input current drawn by the active-power filter for the amplifier based at least in part on the output-load feedforward signal.

* * * * *